3,172,906
GUANIDIUM-α-AMINO-ALKYLTHIOBUTYRATES
Takeo Ueda, 1066 Izumi, Komae-cho, Kitatama-gun;
 Shigeshi Toyoshima, 355 Funabashi-cho, Sedagaya-ku;
 and Atsushi Takada, 30 5-chome, Miyazono-dori, Na-
 kano-ku, all of Tokyo, Japan
No Drawing. Filed Jan. 31, 1962, Ser. No. 170,254
Claims priority, application Japan, Feb. 20, 1961,
36/5,480
4 Claims. (Cl. 260—501)

This invention relates to new chemical compounds and methods for the preparation of the chemical compounds. More particularly, this invention relates to guanidium-α-amino-alkylthiobutyrates and the preparation of such compounds.

There is provided according to the present invention, the compounds selected from the group of compounds having the formula

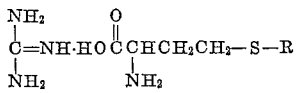

wherein R is alkyl. The term "alkyl" as used herein means both straight and branched chain saturated aliphatic hydrocarbon groups having from one to ten carbon atoms inclusive, e.g., methyl, ethyl, propyl, isopropyl, n-butyl, isobutyl, tertiary-butyl, pentyl, hexyl, 2-ethylhexyl, diuryl, etc. The preferred alkyl groups are those wherein R has from 1 to 6 carbon atoms, inclusive.

The compounds of the present invention are prepared by reacting an α-aminoalkylthiobutyric acid or a salt thereof with guanidine or salt thereof. For example, the compounds can be prepared by reacting a barium salt of an α-amino-alkylthiobutyric acid with guanidine sulfate. The compounds of the invention prepared by such reactions are colorless crystals composed generally of one mole of guanidine and one mole of the α-aminoalkylthiobutyric acid.

The compounds of the present invention possess useful antiviral activity, particularly virucidal activity. Some of the compounds, particularly guanidium ethionate are useful in inhibiting the multiplication of and inactivating of such strains of virus as the Mahoney, the MEF–I, the Lansing, and the Saukett strain of poliomyelitis virus and in the suspension of the production of the toxin-like substance (the C.P.E. factor) produced by poliomyelitis virus. The compounds of the present invention are effective in inhibiting the multiplication of the measles virus (Edmonstan strain). The compounds of this invention are also useful in the study of viruses, particularly as a tool to facilitate study of their basic biological characteristics, including their intracellular multiplication and the mechanism of their adsorption on host cells. The compounds of this invention and compositions containing the same are also useful for killing viruses which are not found in the ordinary virus-host relationship in animals, that is, when found to contaminate areas and materials, e.g., animal and poultry growing enclosures as well as a sick room and materials which have been in contact with persons infected with a virus.

In the use of the compounds of this invention, in the decontamination of areas and materials which are contaminated with virus, it is desirable to dissolve or suspend the compounds in a liquid fluid carrier or solvent which may also contain a surface-active agent such as the alkylarylsufonates, or in a gaseous fluid carrier such as the polyhalogenated hydrocarbons containing one or more fluorine atoms, e.g., $CCl_2F_2$ (dichlorodifluoromethane), carbon dioxide, nitrogen, and others known in the aerosol arts.

The following examples will illustrate the preparation of the compounds of the present invention.

EXAMPLE 1

*Preparation of guanidium methionate*

A solution of 3 g. of guanidine in 30 cc. of methanol is added to 7 grams of methionine. The reaction mixture is maintained at room temperature in vacuo. The crude product precipitates from the solution, is collected by filtration, and purified by washing with methanol. The product thus obtained consists of colorless prisms having a melting point of 115 to 120° C. Elemental Analysis: Calculated for $C_6H_{16}O_2N_4S$; N, 26.91%; Found: N, 26.85%.

EXAMPLE 2

*Preparation of guanidium ethionate*

To a solution of 3 grams of guanidine in 30 cc. of methanol, 8 grams of ethionine is added and dissolved completely. The reaction mixture is maintained at room temperature in vacuo until precipitation of the product is completed. The crude product which precipitates from the solution is collected by filtration and purified by washing with methanol. The product thus obtained consists of colorless needles having a melting point of 111 to 115° C. Elemental Analysis: Calculated for $C_7H_{18}O_2N_4S$; N, 25.20%; Found: N, 25.24%.

EXAMPLE 3

*Preparation of guanidium α-amino-γ-hexylthiobutyrate*

To a solution of 3 grams of guanidine in 30 cc. of methanol, 13 grams of α-amino-γ-hexylthiobutyric acid is added. The reaction mixture is maintained at room temperature in vacuo until precipitation of the product is completed. The crude product which precipitates from the solution is collected by filtration and washed with methanol.

EXAMPLE 4

*Comparison of effect of guanidium ethionate with those of guanidine nitrate and ethionine*

(A) The inhibitory effect of guanidium ethionate on the multiplication of polio virus (type-I Mahoney strain) and measles virus (Edmonstan strain) was compared with those of guanidine nitrate and ethionine using tissue culture method, according to the following procedures.

Te HeLa cell was used for polio and Hep. No. 2 cell for measles. YLA medium (yeast extract, lactalbumin hydrolysate medium) added with 15% beef serum was used as the growth medium while YLA medium added with 5% beef serum was used as the maintenance medium. The observations with polio virus were continued for 10 days and with measles virus for 21 days. $10^{-3}$ mole of the test compounds was added into tubes in which the monolayer cell sheet had been established and immediately thereafter, each of 10 fold dilutions of the viral material was added into the tubes and the tubes were incubated at 37° C. After daily microscopic observations, $TCD_{50}$ of the control and the treated groups was calculated by using Reed and Muench's citation method [Am. J. of Hygiene, 27, 493 (1938)]. The results are shown in Table I.

TABLE I

| Compound Used | Concentration of Compound (in Mole) | TCD$_{50}$ Against— | | | |
|---|---|---|---|---|---|
| | | Polio Virus | | Measles Virus | |
| | | Control | Treated | Control | Treated |
| Guanidine Nitrate | $10^{-3}$ | $10^{-8}$ | $10^{-4}$ | $10^{-7.5}$ | $10^{-4.5}$ |
| Ethionine | $10^{-3}$ | $10^{-8}$ | $10^{-8}$ | $10^{-7.5}$ | $10^{-7.5}$ |
| Guanidium Ethionate | $10^{-3}$ | $10^{-8}$ | $10^{-3}$ | $10^{-7.5}$ | $10^{-3.5}$ |

(B) In a second test procedure, 100 TCD$_{50}$ of polio virus was inoculated in tubes in which the monolayer cell sheet had been established, then each of the test compounds and maintenance medium were added to the tubes. After incubation at 37° C., it was determined whether cytopathogenic effect was observed or not. The results were shown in Table II.

TABLE II

| Compound Used | Concentration of Compound (in Mole) | Control | Tested |
|---|---|---|---|
| Guanidine Nitrate | $2 \times 10^{-4}$ | 0/2 | 0/2 |
| Ethionine | $2 \times 10^{-4}$ | 0/2 | 0/2 |
| Guanidium Ethionate | $2 \times 10^{-4}$ | 0/2 | 2/2 |

The denominator denotes the number of tubes used for the experiment, while the numerator denotes the number of tubes in which the cytopathogenic effect was *not* observed.

(C) Conclusion:

From the date of Table I and II, it is concluded that guanidium ethionate is more effective in inhibiting the multiplication of both polio and measles virus than guanidine nitrate and further that ethionine has no inhibitory effect on either test virus.

We claim:

1. The compounds having the formula

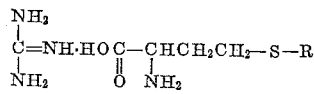

wherein R is an alkyl radical having from one to ten carbon atoms inclusive.

2. Guanidium ethionate.
3. Guanidium methionate.
4. Guanidium-α-amino-γ-hexylthiobutyrate.

References Cited in the file of this patent

UNITED STATES PATENTS 2,695,310    Schramm et al.    Nov. 23, 1954
2,872,469    Stevens    Feb. 3, 1959

OTHER REFERENCES

Hill et al.: Chem. Abst., vol. 30 (1936), col. 3409–3410.
Kitagawa et al.: Ibid.
Brown: Chemical Abst., vol. 47, col. 2253 (1953).
Schoberl et al.; Chem. Abst., vol. 51 (1957), col. 2549–2551 (2 pp.).
Ueda: Chemical Abst., vol. 52 (1958), col. 13783.
Reid: Organic Chemistry of Bivalent Sulfur, vol. III, 1960, p. 259, 260.